Sept. 12, 1967  J. L. McMAHON  3,341,192
AUTOMATIC SHEET TRANSPORT MEANS FOR MESSAGE
SCANNING APPARATUS
Filed Oct. 5, 1965  7 Sheets-Sheet 1

INVENTOR:
JOHN L. McMAHON
BY J. B. Burke
ATTORNEY

INVENTOR:
JOHN L. McMAHON
BY J. B. Burke
ATTORNEY

Sept. 12, 1967 J. L. McMAHON 3,341,192
AUTOMATIC SHEET TRANSPORT MEANS FOR MESSAGE
SCANNING APPARATUS
Filed Oct. 5, 1965 7 Sheets-Sheet 5

INVENTOR:
JOHN L. McMAHON
BY J. B. Burke
ATTORNEY

Sept. 12, 1967 J. L. McMAHON 3,341,192
AUTOMATIC SHEET TRANSPORT MEANS FOR MESSAGE
SCANNING APPARATUS
Filed Oct. 5, 1965 7 Sheets-Sheet 6
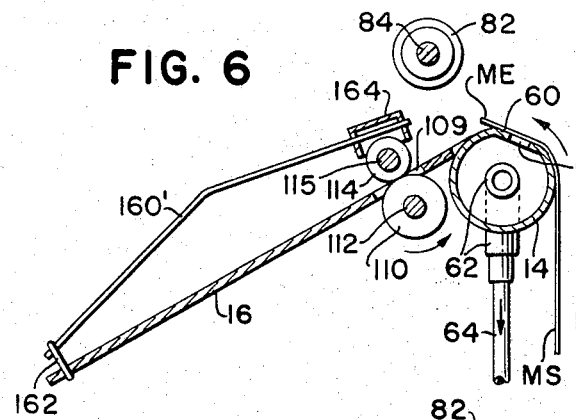
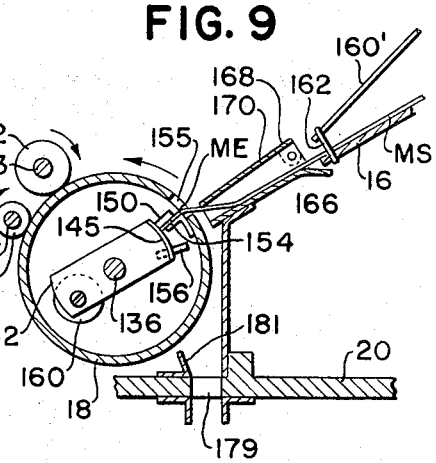
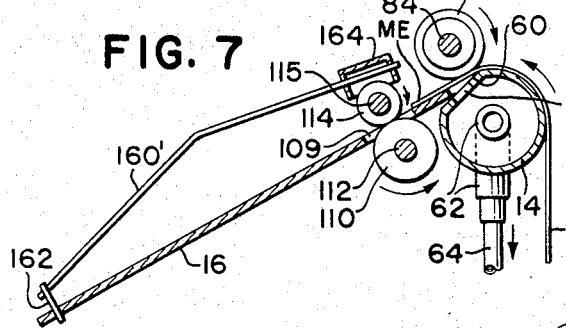
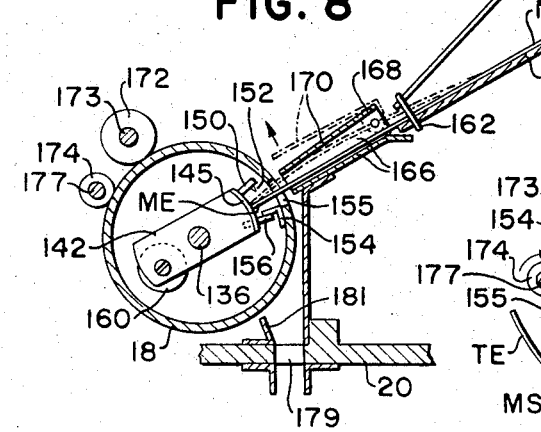
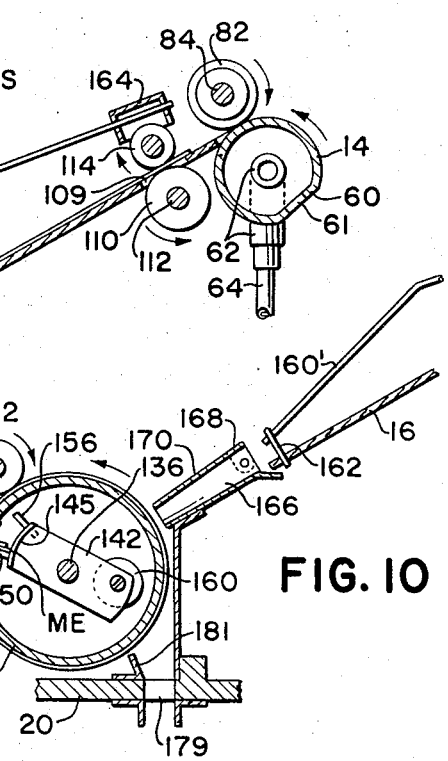
INVENTOR:
JOHN L. McMAHON
BY J. B. Burke
ATTORNEY Sept. 12, 1967 J. L. McMAHON 3,341,192
AUTOMATIC SHEET TRANSPORT MEANS FOR MESSAGE
SCANNING APPARATUS
Filed Oct. 5, 1965 7 Sheets-Sheet 7
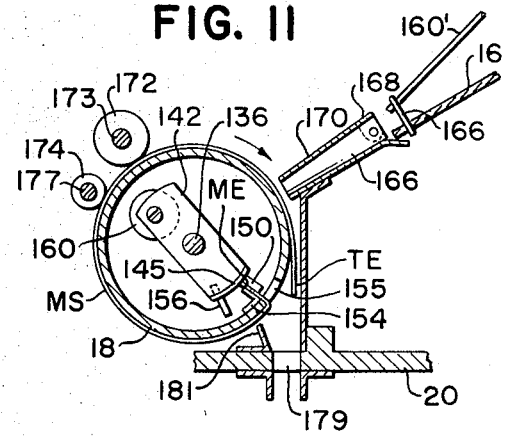
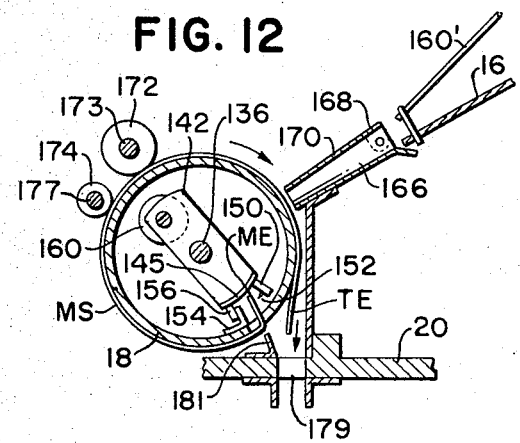
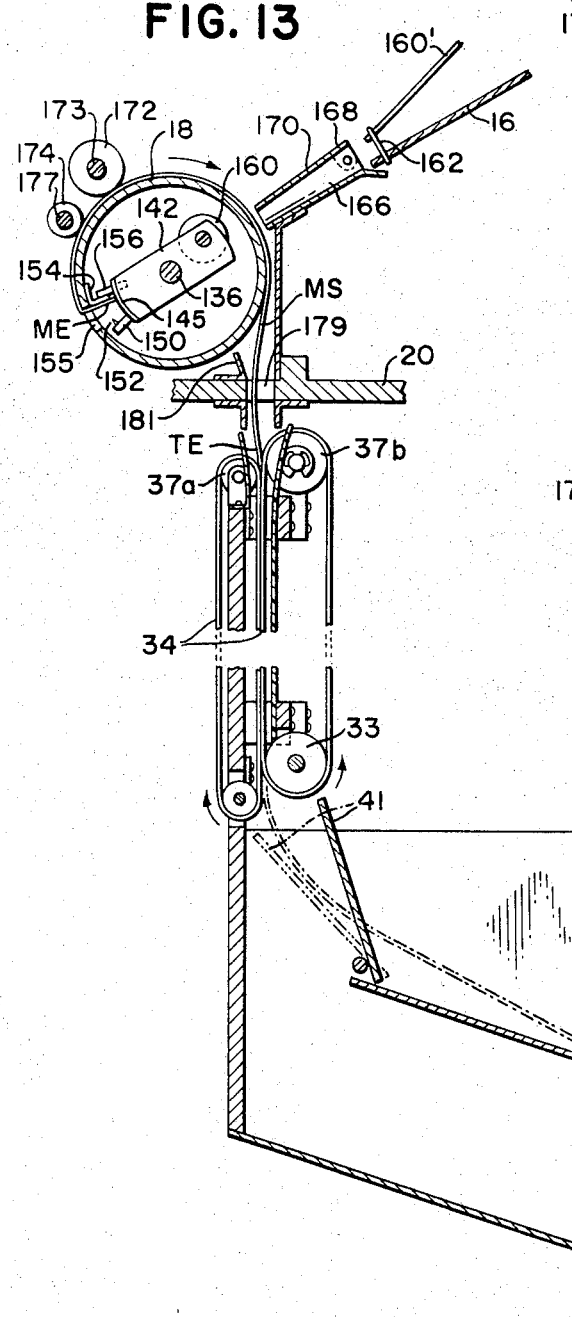
INVENTOR:
JOHN L. McMAHON
BY J. B. Burke
ATTORNEY United States Patent Office 3,341,192
Patented Sept. 12, 1967

3,341,192
AUTOMATIC SHEET TRANSPORT MEANS FOR MESSAGE SCANNING APPARATUS
John L. McMahon, Sag Harbor, N.Y., assignor to The Western Union Telegraph Company, New York, N.Y., a corporation of New York
Filed Oct. 5, 1965, Ser. No. 493,114
7 Claims. (Cl. 271—5)

This invention relates to apparatus for automatically transporting message sheets in message scanning apparatus. The invention has particular applicability to message or character reading apparatus of the general type described in U.S. Patent No. 2,170,138, but it is also applicable to copy scanners of various types useful in facsimile, telegraph and data transmission systems. The invention more particularly concerns automatically operated electromechanical apparatus for removing message sheets sequentially from a storage bin, loading a message sheet on a scanning drum, transporting the loaded scanning drum through a scanning position, unwrapping the message sheet from the scanning drum and discharging the message sheet into accepted or rejected message bins.

According to the invention, the apparatus includes a message storage bin which has a narrow sheet metal pocket in which a plurality of rectangular message sheets can be stored. Each sheet bears a message inscribed in graphic characters in a plurality of spaced parallel lines. A pickup drum lies horizontally adjacent to one upper lip of the bin so that the top of the nearest message may readily contact the length of the drum. This drum is provided with a longitudinal slot and is subjected to an internal vacuum pressure, adjustable as to intensity which tends to draw the adjacent message into tangency with the surface of the drum, alongside of the slot. The drum has a flattened surface portion at the slot in order to increase the area of contact of the message sheet with the drum surface. This decreases the amount of air leakage into the slot and enhances the grip of the drum on the message sheet. The gripped sheet tends to bow outwardly in its lower dimension and to push the next adjacent message sheet away. This prevents lifting more than one message sheet at a time. The pickup drum then revolves to lift the gripped message sheet and to bend it forwardly in the direction of a message chute leading to a scanning drum. This process is aided by a cam-lifted free-rolling pressure wheel disposed above one end of the chute. This wheel is arranged to descend over the on-coming edge of the message sheet to bend it downward against the chute and beneath a driven wheel which continues to pull the message sheet from the bin and advance it down the chute.

The leading edge of the message sheet enters a lengthwise slot in the scanning drum and stops there. Just inside this slot is a latch and pressure bar provided with spaced needle-points on one side adjacent to the message sheet. The scanning drum then starts to revolve to press the message sheet against the latch and pressure bar whose movement is restrained by a brake in order to provide the pressure requisite for perforation by the needle-points. The scanning drum then moves an approximate half revolution so as to advance the message sheet to a position where the top line of the message thereon is under an optical scanning device. At this time a number of control operations occur and then the scanning drum continues its revolution to complete the wrapping of the message sheet.

Scanning then proceeds, one revolution for each line. The scanning drum advances axially at a rapid rate between lines. The message sheet is disposed so that the message lines extend circumferentially of the drum.

The apparatus includes a drum advance control mechanism wherein the velocity of the advance movement follows sine wave pattern, so that start and finish of the movement are at approximately zero velocity. The axial distance of the drum advance or message line spacing is controlled in part by message format, and in part by control circuitry.

When the optical scanner reaches the end of message characters on the message sheet, the scanning drum reverses to unwrap the sheet and the latch and pressure bar releases the sheet which drops into a chute leading to a sent (accepted) message bin. In the event that any character of the message is unreadable, or any deviation from a preset format is encountered, or any violation of prescribed safety conditions occurs, scanning of the message is interrupted. The message sheet is unwrapped automatically from the scanning drum and is discharged into a rejected message bin. An appropriate alarm may be sounded calling for supervisory attention to the rejected message.

The general object of the invention is to provide an apparatus for automatically transporting message sheets in message scanning apparatus.

Other objects are to provide: means for automatically withdrawing one message sheet at a time from a message storage bin; means for insuring against lifting more then one sheet at a time from the bin; means for automatically wrapping the withdrawn sheet around a scanning drum; means for coordinating drum position with message scanning control; means for shock-free, fast, axial advance of the scanning drum; means for automatic unloading of the scanned message sheet from the scanning drum; and means for selectively discharging the scanned message sheet into an accepted message bin or rejected message bin.

The invention will be best understood from the following detailed description taken together with the drawings, wherein:

FIGS. 5–13 are simplified views of the message transport apparatus, partially in side elevation, partially in section and partially diagrammatic, illustrating successive steps in the operating cycle of the apparatus.

Figure 1:
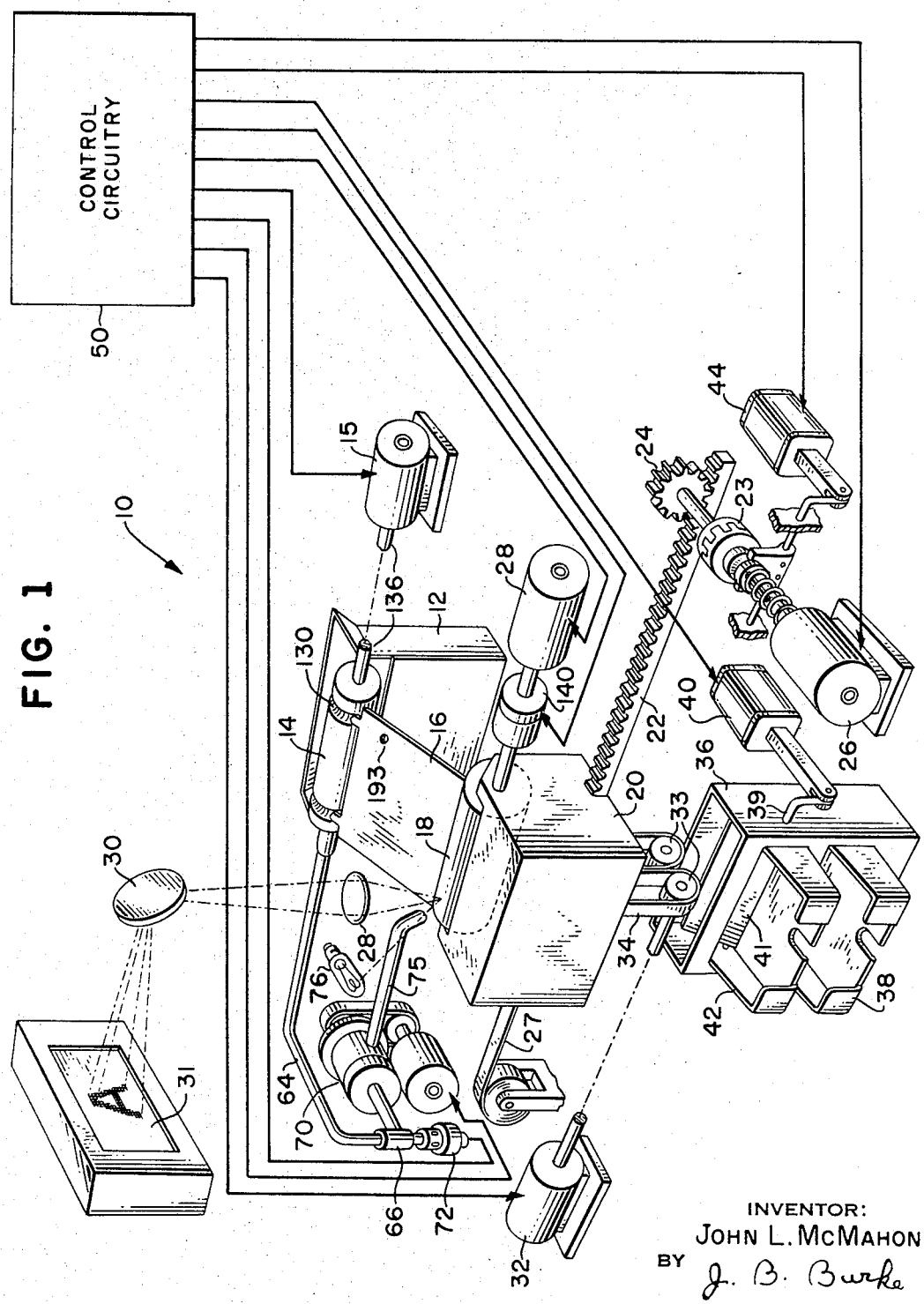
FIG. 1 is a diagrammatic view of components of a character reader system including message sheet transport apparatus embodying the invention.
Figure 2:
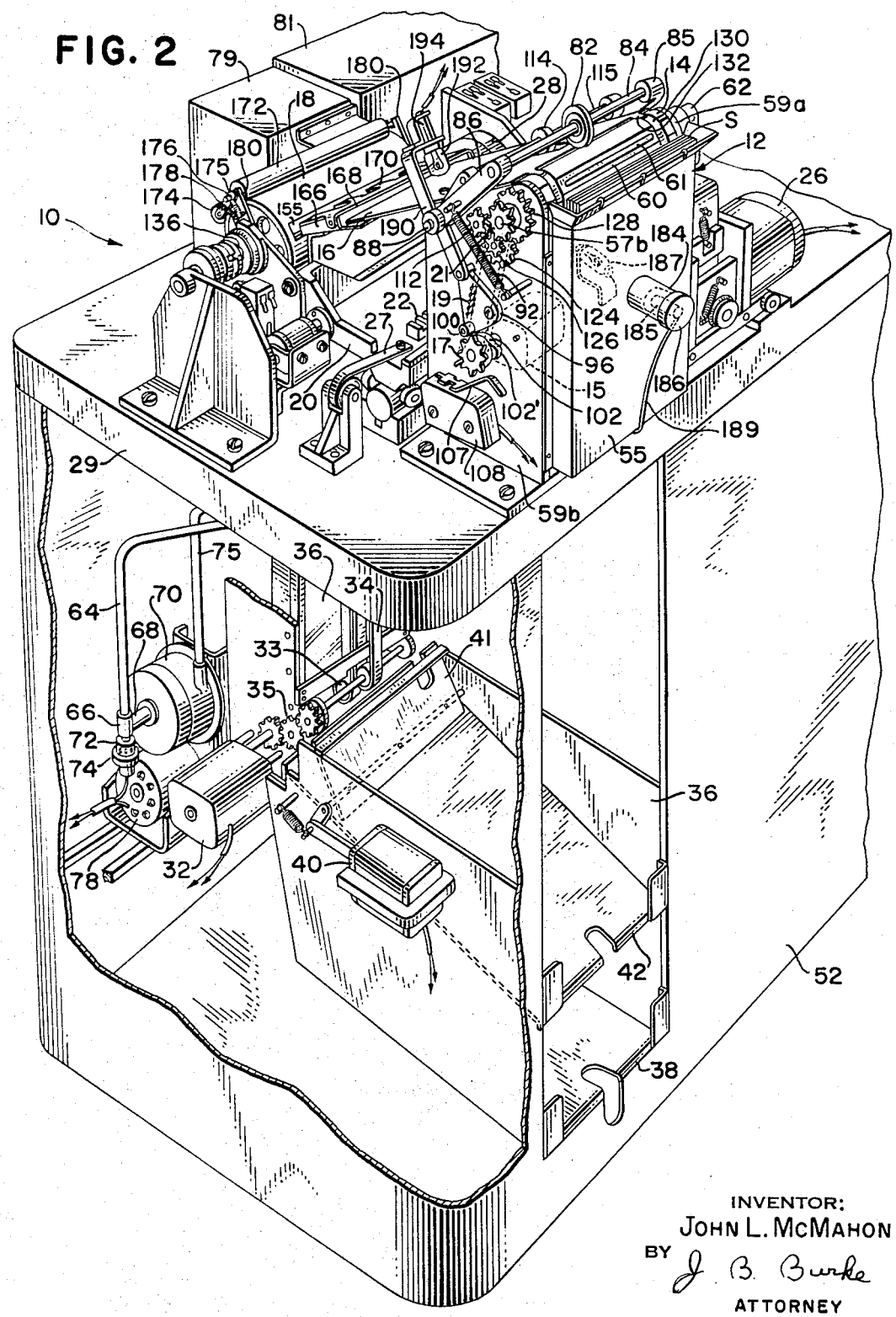
FIG. 2 is a perspective view of message sheet transport apparatus embodying the invention, parts being broken away to show internal construction.
Figure 3:
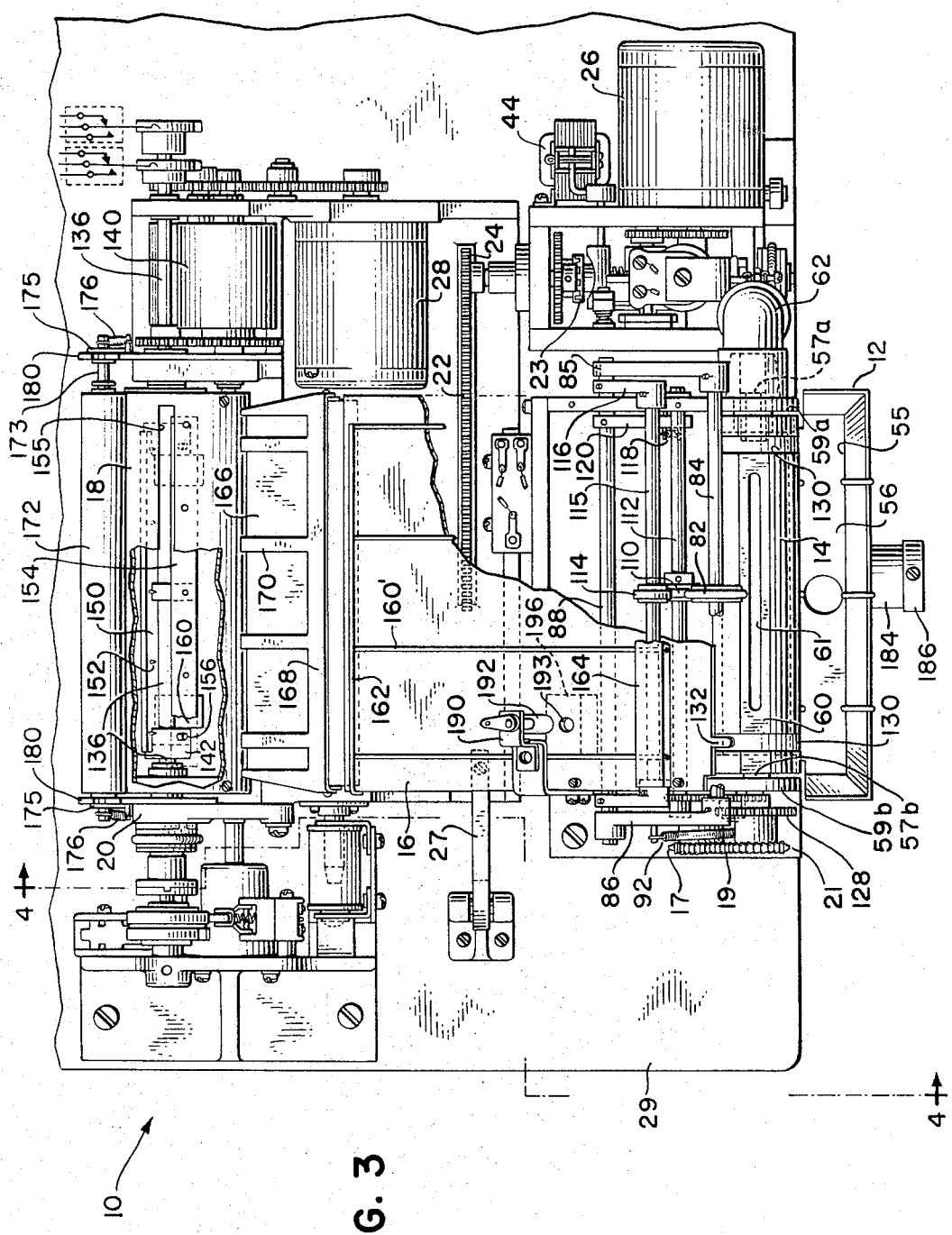
FIG. 3 is a top plan view of the apparatus of FIG. 2, other parts being broken away to show internal construction.
Figure 4:
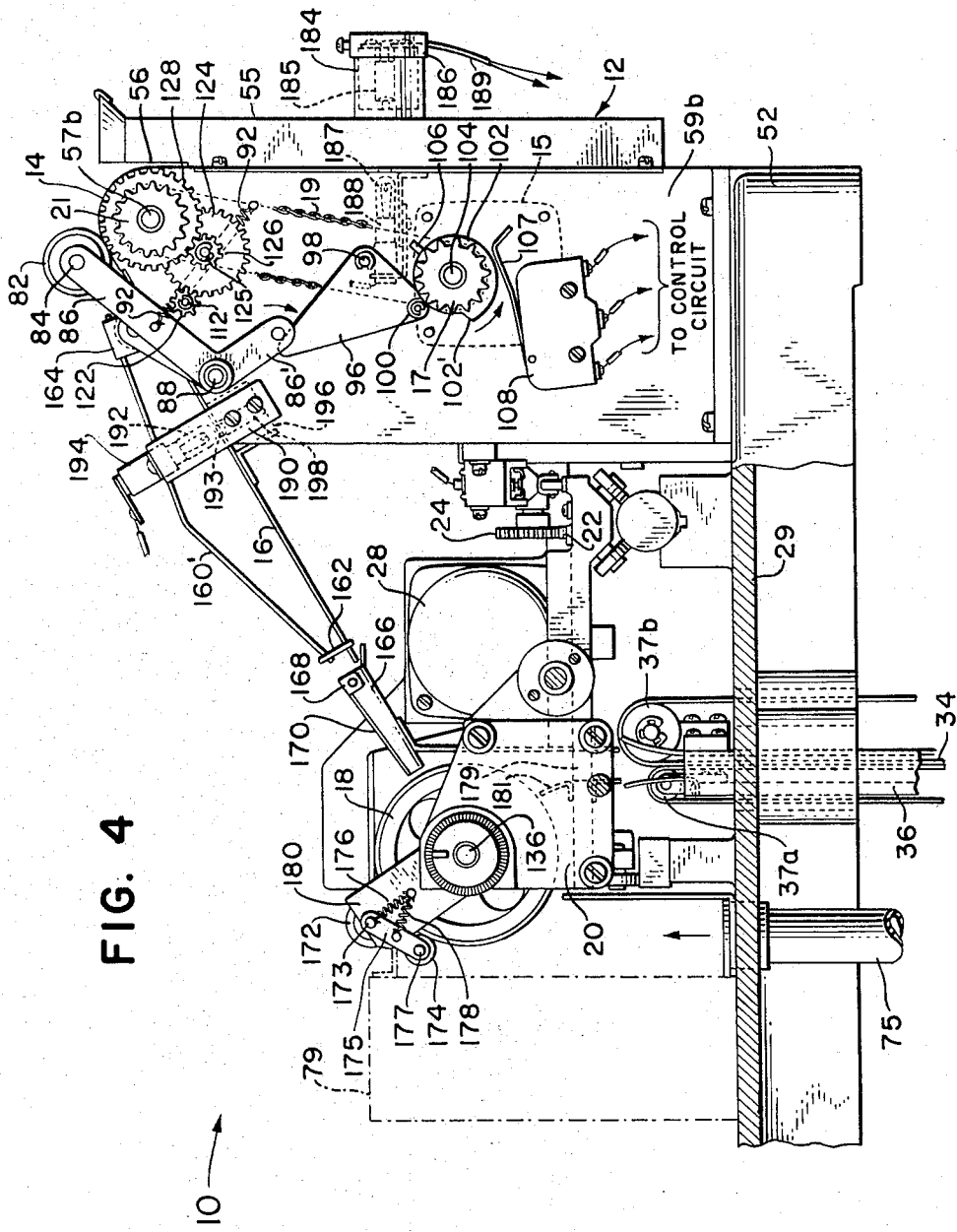
FIG. 4 is an enlarged side view of a portion of the apparatus of FIGS. 2 and 3.
Figure 5:
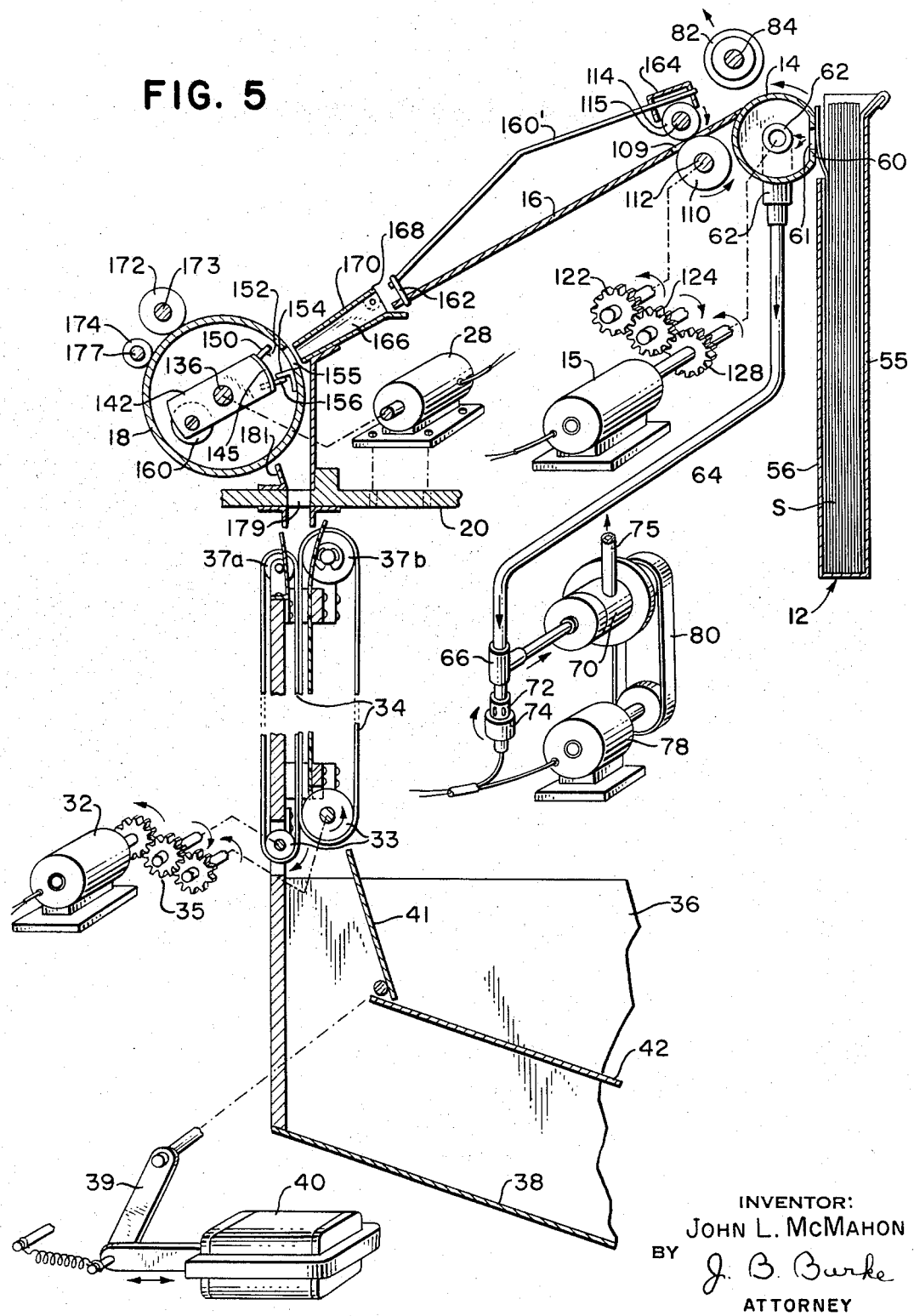

Referring first to FIGS 1–5, there are shown parts of a character reader system 10. Message sheets are stored in a message bin 12. These sheets are drawn one at a time out of the bin by means of a pickup drum 14 rotated by a motor 15 via a lower drive sprocket 17, chain 19 and upper driven sprocket 21. The withdrawn sheet is passed down a chute 16 to a drum 18 around which the message sheet is automatically wrapped. The message drum 18 is supported on a carriage 20 having a horizontally extending rack gear 22 engaged by gear 24 driven by a motor 26 via a clutch 23 to advance the carriage. Carriage return is effected by a spring 27 attached between the carriage and platform 29. The drum 18 is rotated by motor 28 while the graphic copy on a sheet loaded on the drum is scanned via an optical system including lens 28 and mirror 30. The images of scanned characters are projected upon a scanning screen 31 which includes a matrix of cells such as described in the above-mentioned Patent 3,170,138. Motor 32 is connected via gears 35 to pulleys 33 which drive two vertical, closely spaced belts 34. The belts are supported on upper pulleys 32a, 37b. When a scanned message sheet is unloaded from drum 18 the unloaded message sheet is passed between belts 34 down a message sheet receiving chute 36. The sheet will be received in a lower compartment or bin 38 of the chute. A solenoid 40 is connected via lever 39 to a vane or plate 41 in chute 36 for diverting the unloaded message sheet to upper reject message compartment or bin 42 if during the scanning of the message sheet any irregularity is encountered making accurate scanning of the message impossible. A solenoid 44 is arranged to open clutch 23 to disconnect the shaft of motor 26 from gear 24 and permit spring return of carriage 20 to starting position. The system includes control circuitry 50 which controls the operation of the several motors 15, 26, 28, 32 and solenoids 40, 44 in a prescribed sequence. The system 10 further includes a cabinet 52 housing control circuitry 50. The cabinet has an upper platform 29 on which is mounted the message transport components. Bin 12 at the front of the platform has vertical front and rear walls 55, 56, a closed bottom 58 and open top. A file of message sheets S is stored in this bin awaiting removal one at a time to be scanned in the apparatus.

Drum 14 is rotatably supported on shafts 57a, 57b at upper ends of frame plates 59a, 59b. The land extends the full length of the drum. An elongated slot or hole 61 is centrally located in the land 60 and opens into the interior of the drum. A stationary conduit 62 opens into one end of the drum; see FIG. 5. This conduit is mounted on frame plate 59a. The conduit is connected to a pipe 64 which terminates at a T-coupling 66 in the cabinet. A short pipe 68 is connected between coupling 66 and air blower 70. A valve 72 operated by a solenoid 74 is connected to one end of coupling 66. A pipe 75 extends from the blower. This blower forces a stream of air up pipe 75. Pipe 75 terminates near lamp 76 which illuminates the message sheet on drum 18. The air stream issuing from pipe 75 cools the lamp and adjacent parts of the apparatus. Blower 70 is driven by a motor 78 via belt 80. Lamp 76 is located in a housing 79 on platform 29 near drum 18. This housing also contains screen 3 and lens system 28, 30. Adjacent housing 79 is another housing 81 which may contain part of control circuit 50.

Valve 72 is normally open so that air entering this valve is directly forced through the blower and up pipe 75. Since conduit 62 is normally open, a stream of air also enters slot 61 but this stream of air is much less than that entering through valve 72. When, however, solenoid 74 is energized, the valve 72 closes and blower 70 draws a strong suction through conduit 62 and pipe 64. This suction at slot 61 is used to engage an adjacent message sheet in bin 12, see FIG. 6.

A roller 82 is centrally located at drum 14 and rides on this drum. Roller 82 is carried by a shaft 84 extending axially parallel to drum 14. Shaft 84 is supported by a lever 85 and a bell crank lever 86 pivoting on a shaft 88 extending through frame plates 59a, 59b on which drum 14 is supported. A coil spring 92 engaged on plate 59b biases upper arms of levers 85, 86, toward the drum 14 so that the roller 82 is urged against the drum as the drum rotates. Lever 86 engages a triangular shaped lever 96 pivoting on a pin 98. On the lower end of lever 86 is a small rotatable cam follower roller 100. This roller is held by pressure exerted through spring 92 and lower arm 86' of lever 86 against a cam 102 mounted on shaft 104 of drum drive motor 15. This shaft also carries sprocket 17. A pin 106 extends radially outward of the cam and is axially spaced from the eccentric periphery of the cam. This pin engages arm 107 of a switch 108 to actuate the switch at a point in the loading cycle of the apparatus.

A short aperture 109 is located in plate 16 just below its upper edge, slightly spaced from drum 14; see FIG. 6.

In aperture 109 extends a roller 110 carried by shaft 112 disposed under plate 16 and supported on frame plates 59a, 59b. An upper roller 114 contacts roller 110 and rotates therewith. Roller 114 is supported by a shaft 118 is located on the inner side of frame plate 59a. This spring engages a lever arm 120 on shaft 88 and biases the lever arms 116 toward plate 16 so that roller 114 presses against roller 110.

Shaft 112 which carries roller 110 extends through frame plate 59b and carries spur gear 122. Gear 122 is engaged with a larger gear 124 mounted on a stub shaft 125 at frame plate 59b. Shaft 125 also carries a small gear 126 engaged with a larger gear 128 mounted on shaft 57b which also supports one end of the drum 14 and the sprocket 21. The drive motor 15 thus serves to rotate the drum 14 and roller 110, and to elevate the roller 82 cyclically when high camming point 102' of cam 102 comes around to cam follower 100.

Circumferential grooves 130 are provided in drum 14 near opposite ends. Fingers 132 extending outwardly of the upper edge of plate 16 extend into these grooves and serve as guides for a message sheet passing down the plate 16.

Drum 18 is located near the bottom edge of inclined plate 16. The drum is rotatably mounted on a shaft 136 operatively connected to drive motor 28 via a clutch 140. Mounted on shaft 136 inside the drum 18 is a pair of radially extending arms 142 located near opposite ends of the drum. These arms carry at one end thereof a bar 145. Bar 145 extends axially of the drum. At one edge of bar 145 are radially extending pins 150 having teeth 152 extending circumferentially toward holes in an apertured plate 154 secured to the interior of the drum at one edge of an elongated slot 155 in the drum. This slot admits the leading edge of a message sheet to be wrapped on the drum. Plate 154 extends radially inward of the drum; see FIGS. 5, 8–13. A narrow plate 156 extends radially outward of bar 145 at its other edge. This plate may contact plate 154 and when it does so the teeth 152 are spaced from plate 154. A cylindrical counterweight 160 is supported at other ends of arms 142.

Paper guide spring wires 160' are suported by bracket plate 162 above plate 16. At upper forward ends of the wires is a channel bar 164 which rests on shaft 114 and is lifted thereby when the shaft is raised. A narrow tapered chute 166 is located at the lower end of plate 16. This chute feeds message sheets to drum 18. The chute has a pivotable upper 168 carrying paper guide fingers 170. A pressure roller 172 is supported by shaft 173 on carriage end plates 180. Another roller 174 is carried by shaft 178 on lever arms 175. The lever arms are pivotally supported on plates 180. The rollers are urged against the drum 18 by springs 176, 178 to insure smooth wrapping of the message sheet around the drum.

An opening 179 is provided in the platform of carriage 20 near drum 18, through which opening a discharged message sheet passes. A paper guide member 181 is disposed at opening 179 to guide the discharged message sheet; see FIG. 5.

The operation of the invention will be understood by an inspection of FIGS. 4–13 to which reference is now made. Message sheets S are stored in bin 12 with the message side facing forward. Full suction is applied at slot 61 as valve 72 closes so that when the flat land 60 of drum 14 comes around to the rear wall 56 of bin 12 the exposed upper edge ME of rear sheet MS is engaged at land 60 as clearly shown in FIG. 5. Drum 14 continues to rotate counterclockwise. FIG. 6 shows sheet MS being pulled up on drum 14 underneath roller 82 which is raised by elevated shaft 84. The free upper edge ME of sheet MS is then pressed down on chute 16 as roller 82 is lowered to drum 14 as shown in FIG. 7. The sheet MS is passed down chute 16 by rollers 110, 114. The leading edge ME of the sheet now enters slot 155 in drum 18 which has rotated around to position slot 155, at the lower end of chute 16. The leading edge ME of the sheet is guided underneath the pins 150 as shown in FIG. 8. Then drum 18 begins to rotate counterclockwise with respect to pins 150 so that the teeth 152 penetrate leading edge ME of the sheet as shown in FIG. 9. Drum 18 continues to rotate along with the arms 142 and bar 145, as shown in FIG. 10 so that the sheet MS is wound around the drum.

Scanning of the message on sheet MS now takes place by means of the optical apparatus as the carriage 20 moves the rotating drum axially the length of one message line on the message sheet. After completion of scanning, unloading of the message sheet MS takes place as illustrated in FIGS. 11–13 to which reference is now made. Spring 27 returns the carriage to unloading position.

Drum 18 which previously rotated counterclockwise as viewed in FIGS. 8 and 9, now rotates clockwise. As the drum 18 rotates, the trailing or free edge TE of sheet MS hangs down and is engaged by guide member 181 at the platform opening 179, as shown in FIGS. 11 and 12. At the same time pins 150 opens to release edge ME of the sheet. Drum 18 continues to rotate clockwise and the message sheet with edge TE at the bottom drops down chute 36 between belts 34. In FIG. 13 the message sheet MS is shown passing down between belts 34. Plate 41 is in the solid line elevated position so that sheet MS will pass down to the lower message receiving compartment or bin 38. If plate 41 is rotated to the dotted line positioned shown in FIG. 13 then sheet MS will be diverted and will pass down plate 41 into the upper compartment or bin 36. Plate 41 is actuated to deflect the sheet into compartment 36 upon receipt of a message rejection signal from the control circuitry 50. The apparatus is now ready to extract another message sheet from bin 12 to repeat the procedure described above.

A cylindrical housing 184 closed by a cap 186 may be mounted on the front wall 55 of bin 12. In this housing is a photoelectric cell 185 connected via cable 189 to the control circuit 50. On the inner or rear wall 56 of the bin 12 is socket 188 suporting a lamp 187; see FIG. 4. This lamp projects a light through aligned holes in walls 55, 56 to the photoelectric cell 185. If no message sheets S are present in the bin 12, the light falling on cell 185 excites the cell to produce an electrical voltage which may be used to actuate the control circuit to stop operation of the apparatus until other message sheets to be read in the apparatus are placed in bin 12.

Another socket 194 may be mounted on a bracket 190 at frame plate 59b. A lamp 192 is carried by the socket 194. This lamp projects a light through a hole 193 provided in chute 16; see FIG. 3. Underneath chute 16 at hole 193 is a closed capsule 196 containing a photoelectric cell 198 which receives light from lamp 192. Photoelectric cell 198 is connected to control circuit 50. The cell is activated by light falling upon it to apply a voltage at the control circuit. If the light falling on cell 198 is cut off, the voltage applied by this cell to control circuit 50 will drop and the control circuit will be operated to stop operation of the apparatus. The apparatus is arranged so that when a single message sheet MS passes down the chute 16, the light reaching the cell 198 through the sheet at hole 193 will be sufficient to maintain at least a predetermined voltage at the control circuit 50. However, if two or more sheets are drawn up out of bin 12 simultaneously, the plurality of superimposed sheets will reduce the intensity of light reaching the photoelectric cell 198. This will result in reduction of the voltage applied from cell 198 to the control circuit below a critical value, and the control circuit will respond by stopping operation of the apparatus until the operator or attendant of the apparatus removes the superimposed sheets from the chute.

While neither the photoelectric cell 185 nor cell 198 are absolutely essential to the operation of the message sheet transport apparatus embodying the present invention, they may be provided if desired to improve efficiency of operation.

What is claimed is:
1. Message sheet transport means for sheet scanning apparatus, comprising:
 (a) a bin for storing a plurality of message sheets in upright position;
 (b) An axially horizontal, rotatable first drum disposed adjacent to said bin, said drum having a longitudinal lateral flat land;
 (c) suction producing means connected to the drum, said drum having a lateral longitudinal slot in said land for passing air into the drum under said suction, whereby an edge of one message sheet in the bin facing said drum is drawn by suction against said land;
 (d) a chute having a plate angularly disposed to the drum with one end adjacent the drum for receiving said sheet from the drum;
 (e) roller means on the chute for passing said sheet down the chute;
 (f) a reversible, rotatable second drum located at a lower other end of chute, said second drum having a longitudinal lateral slot for receiving a leading edge of said sheet from the chute; and
 (g) means in said second drum for engaging said leading edge of the sheet as the second drum rotates in one direction, whereby said sheet is wound up on the second drum for scanning in said apparatus.

2. Message sheet transport means according to claim 1, further comprising:
 (a) another chute located under the second drum;
 (b) sheet carrying means in the other chute;
 (c) paper guide means at the top of the other chute to engage a free trailing end edge of said sheet when said second drum is reversed to rotate in an opposite direction and to release said leading edge of the sheet, whereby said sheet is guided into the other chute and is there engaged by said sheet carrying means; and
 (d) a compartment under said sheet carrying means for receiving said sheet therefrom.

3. Message sheet transport means according to claim 2, further comprising:
 (a) another compartment in said other chute; and
 (b) a rotatable vane disposed in said other chute for diverting the sheet entering said other chute into said other compartment when said vane is rotated to block the first named compartment.

4. Message sheet transport means according to claim 1, wherein the last named means comprises:
 (a) a bar carrying pins with teeth thereon for engaging the leading edge of the sheet, said bar being stationary initially as the second drum begins to rotate so that said teeth penetrate the leading edge of the sheet, said bar being rotatable with the second drum after the teeth penetrate the leading edge of the sheet so that the sheet winds up on the second drum.

5. Message sheet transport means according to claim 4, further comprising:
 (a) another chute located under the second drum;
 (b) sheet carrying means in the other chute;
 (c) paper guide means at the top of the other chute to engage a free trailing end edge of said sheet when said second drum is reversed to rotate in an opposite direction and to release said leading edge of the sheet, whereby said sheet is guided into the other chute and is there engaged by said sheet carrying means; and
 (d) a compartment under said sheet carrying means for receiving said sheet therefrom.

6. Message sheet transport means according to claim 4, further comprising:
 (a) another chute located under the second drum;
 (b) sheet carrying means in the other chute;
 (c) paper guide means at the top of the other chute to engage a free trailing end edge of said sheet when said second drum is reversed to rotate in an opposite direction and to release said leading edge of the sheet, whereby said sheet is guided into the other chute and is there engaged by said sheet carrying means;
(d) a compartment under said sheet carrying means for receiving said sheet therefrom;
(e) another compartment in said other chute; and
(f) a rotatable vane disposed in said other chute for diverting the sheet entering said other chute into said other compartment when said vane is rotated to block the first named compartment.

7. Message sheet transport means for sheet scanning apparatus comprising:
(a) a bin for storing message sheets;
(b) a first drum rotatable drum disposed adjacent said bin;
(c) means for applying suction to said drum for drawing one sheet out of the bin at a time;
(d) a first chute for receiving said sheet from the drum;
(e) means for driving the sheet down the chute;
(f) a reversible, rotatable second drum located at said chute for receiving said sheet from the chute;
(g) means for engaging said sheet at the second drum;
(h) means for winding said sheet automatically around the second drum as the second drum turns in one direction, to position the sheet for scanning in said apparatus; and
(i) means for receiving said sheet from the second drum when the second drum is reversed to unwind and release the sheet from the second drum.

References Cited

UNITED STATES PATENTS 2,855,195 10/1958 Young _____ 271—27 X
3,166,310 1/1965 Kittredge _____ 271—5

M. HENSON WOOD, Jr., *Primary Examiner.*

R. A. SCHACHER, *Assistant Examiner.*